United States Patent
Joo et al.

(10) Patent No.: US 11,370,964 B2
(45) Date of Patent: Jun. 28, 2022

(54) POLYMER COMPOSITE FOR ENCAPSULATING QUANTUM DOTS

(71) Applicant: Rohm and Haas Electronic Materials LLC, Marlborough, MA (US)

(72) Inventors: Jaebum Joo, Somerville, MA (US); James C. Taylor, Grafton, MA (US); Tanya Singh-Rachford, South Grafton, MA (US)

(73) Assignee: ROHM AND HAAS ELECTRONIC MATERIALS LLC, Marlborough, MA (US)

( * ) Notice: Subject to any disclaimer, the term of this patent is extended or adjusted under 35 U.S.C. 154(b) by 843 days.

(21) Appl. No.: 16/311,254

(22) PCT Filed: Jun. 22, 2017

(86) PCT No.: PCT/US2017/038779
§ 371 (c)(1),
(2) Date: Dec. 19, 2018

(87) PCT Pub. No.: WO2018/009345
PCT Pub. Date: Jan. 11, 2018

(65) Prior Publication Data
US 2019/0322925 A1  Oct. 24, 2019

Related U.S. Application Data

(60) Provisional application No. 62/359,986, filed on Jul. 8, 2016.

(51) Int. Cl.
| | | |
|---|---|---|
| *C09K 11/02* | (2006.01) | |
| *C08L 33/06* | (2006.01) | |
| *C08L 35/02* | (2006.01) | |

(52) U.S. Cl.
CPC .......... *C09K 11/02* (2013.01); *C08L 33/066* (2013.01); *C08L 35/02* (2013.01); *C08L 2203/16* (2013.01); *C08L 2203/20* (2013.01)

(58) Field of Classification Search
CPC .................................................. C09K 11/02
See application file for complete search history.

(56) References Cited

U.S. PATENT DOCUMENTS

| | | | | |
|---|---|---|---|---|
| 6,025,433 A | * | 2/2000 | Shibatoh | C09D 175/00 524/92 |
| 6,093,757 A | * | 7/2000 | Pern | B32B 17/10678 524/99 |
| 2008/0277626 A1 | * | 11/2008 | Yang | C09D 11/50 252/301.36 |
| 2011/0230582 A1 | * | 9/2011 | Kito | C09D 11/101 522/39 |
| 2013/0304946 A1 | * | 11/2013 | Donaghey | H04L 61/2038 710/17 |
| 2016/0161066 A1 | | 6/2016 | Sung et al. | |
| 2016/0161088 A1 | | 6/2016 | Sung et al. | |
| 2016/0272885 A1 | | 9/2016 | Bai et al. | |
| 2019/0085112 A1 | | 3/2019 | Bai et al. | |

OTHER PUBLICATIONS

Search report for corresponding International Application No. PCT/US2017/038779 dated Aug. 22, 2017.

* cited by examiner

*Primary Examiner* — C Melissa Koslow
(74) *Attorney, Agent, or Firm* — G. Creston Campbell

(57) ABSTRACT

A polymer composite comprising: (a) quantum dots; (b) polymerized units of a compound of formula (I) wherein R1 is hydrogen or methyl and R2 is a C6-C20 aliphatic polycyclic substituent; and (c) a light stabilizer compound comprising two 1-alkyloxy-2,2,6,6-tetramethyl-4-piperidinyl substituents.

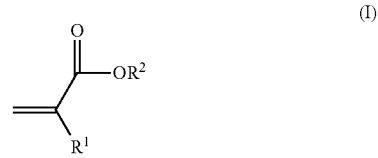

(I)

9 Claims, No Drawings

POLYMER COMPOSITE FOR ENCAPSULATING QUANTUM DOTS

FIELD OF THE INVENTION

The present invention relates to a multilayer polymer composite containing quantum dots and to a process for preparing the composite.

BACKGROUND OF THE INVENTION

Semiconductor quantum dots (QD) provide optical absorption and emission (photoluminescence (PL) or electroluminescence (EL)) behaviors that are significantly different from those of bulk materials. As the particle size decreases, effective energy bandgap (Eg), or available energy levels, increases and creates a blue shifted PL spectrum. This spectrum tunability by the particle size dependent quantum confinement effect within the same material is a critical advantage over conventional bulk semiconductors. Because of their unique optical properties, QD have been of great interest in many display and lighting applications. Most QD have inorganic shells with a larger bandgap material to confine electron and hole pairs within the core region and prevent any surface charge states. The outer shells are then capped by organic ligands to reduce trap states of the shell that can lead to reduced quantum yield (QY). Organic ligands help QD to disperse in organic/aqueous solvents. Typical organic ligands surrounding QD have relatively long alkyl chains which provide high solubility in non-polar solvents or monomers. Unfortunately, QD are very susceptible to photo-oxidation during light absorption/conversion process. Also, moisture can have similar impacts when ligands are not compatible. QD typically are encapsulated in a polymer matrix to protect them from adverse effects of water and oxygen. For example, U.S. Pat. No. 8,445,178 discloses a variety of polymers as encapsulants. However, this reference does not disclose the polymer compositions described herein.

SUMMARY OF THE INVENTION

The present invention provides a polymer composite comprising:
(a) quantum dots;
(b) polymerized units of a compound of formula (I)

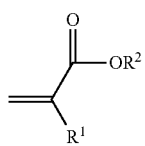

wherein $R^1$ is hydrogen or methyl and $R^2$ is a $C_6$-$C_{20}$ aliphatic polycyclic substituent; and
(c) a light stabilizer compound comprising two 1-alkyloxy-2,2,6,6-tetramethyl-4-piperidinyl substituents.

DETAILED DESCRIPTION OF THE INVENTION

Percentages are weight percentages (wt %) and temperatures are in ° C., unless specified otherwise. Operations were performed at room temperature (20-25° C.), unless specified otherwise. Boiling points are measured at atmospheric pressure (ca. 101 kPa). The term "(meth)acrylate" means acrylate or methacrylate. Quantum dots are well known in the art, see, e.g., US2012/0113672.

In one preferred embodiment of the invention, the polymer composite is part of a multilayer assembly which also comprises an outer layer on each side of the polymer composite. Preferably, the outer layer is an oxygen bather which also inhibits passage of moisture. Preferably, the outer layer comprises a polymer film, preferably one comprising polyethylene terephthalate (PET), polyaryletherketones, polyimides, polyolefins, polycarbonate, polymethyl methacrylate (PMMA), polystyrene, or a combination thereof. Preferably, the outer layer further comprises oxides or nitrides, preferably silicon oxides, titanium dioxide, aluminum oxide, silicon nitrides or a combination thereof. Preferably the oxides or nitrides are coated on the surface of the polymer film facing the QD layer. Preferably, each outer layer comprises a polymer film having a thickness from 25 to 150 microns (preferably 50 to 100 microns) and an oxide/nitride layer having a thickness from 10 to 100 nm (preferably 30 to 70 nm). In some preferred embodiments of the invention, the outer layer comprises at least two polymer film layers and/or at least two oxide/nitride layers; different layers may be of differing composition. Preferably, the outer layers have a very low oxygen transmission rate (OTR, <$10^{-1}$ cc/m$^2$/day) and low water vapor transmission rate (WVTR, <$10^{-2}$ g/m$^2$/day) Preferably, the polymer film in the outer layers has a Tg from 60 to 200° C.; preferably at least 90° C., preferably at least 100° C.

Preferably, the thickness of the polymer composite of this invention is from 10 to 500 microns, preferably at least 20 microns, preferably at least 30 microns, preferably at least 40 microns; preferably no greater than 400 microns, preferably no greater than 300 microns, preferably no greater than 200 microns, preferably no greater than 150 microns. Preferably, the thickness of each outer layer is from 20 to 100 microns, preferably from 25 to 75 microns Preferably, the polymer composite of this invention is prepared by free radical polymerization of the resin prepared by mixing monomers, QD, light stabilizer and other optional additives. Preferably, the resin is coated on a first outer layer prior to curing by typical methods, e.g., spin coating, slot die coating, gravure, ink jet and spray coating. Preferably, curing is initiated by exposing the resin to ultraviolet light (UV) or heat, preferably ultraviolet light, preferably in the UVA range.

Preferably, $R^2$ is a $C_7$-$C_{17}$ aliphatic polycyclic substituent, preferably $R^2$ is a $C_8$-$C_{15}$ aliphatic polycyclic substituent. Preferably, $R^2$ is a bridged polycyclic substituent; preferably a bicyclic, tricyclic or tetracyclic substituent; preferably a bicyclic or tricyclic substituent. Preferably, $R^2$ is a saturated aliphatic substituent. Preferred structures for $R^2$ include, e.g., adamantanes, bicyclo[2,2,1]alkanes, bicyclo[2,2,2]alkanes, bicyclo[2,1,1]alkanes and tricyclodecanes (e.g., tricyclo[5,2,1,0$^{2,6}$]decane); these structures may be substituted with alkyl, alkoxy groups, hydroxy groups or (meth)acrylate esters (i.e., the compound of formula (I) may have at least two (meth)acrylate ester substituents; preferably no more than two); preferably alkyl and alkoxy groups have from one to six carbon atoms, preferably one to four. Tricyclodecanes and bicyclo[2,2,1]alkanes are especially preferred, particularly tricyclo[5,2,1,0$^{2,6}$]decane, dimethanol dimethacrylate and isobornyl acrylate. Preferably, the inner layer comprises polymerized units of a compound of formula (I) having one (meth)acrylate ester substituent and a compound of formula (I) having two (meth)acrylate ester substituents; preferably in a weight ratio from 100:1 to 1:5, respectively; preferably 10:1 to 1:2.

Preferably, the polymer composite of this invention comprises from 50 to 88 wt % polymerized units of compound(s) of formula I; preferably at least 55 wt %, preferably at least 60 wt %, preferably at least 65 wt %; preferably no more than 85 wt %, preferably no more than 82 wt %.

Preferably, the polymer composite of this invention comprises from 0.01 to 5 wt % of quantum dots, preferably at least 0.03 wt %, preferably at least 0.05 wt %; preferably no more than 4 wt %, preferably no more than 3 wt %, preferably no more than 2 wt %. Preferably, quantum dots comprise CdS, CdSe, CdTe, ZnS, ZnSe, ZnTe, HgS, HgSe, HgTe, GaN, GaP, GaAs, InP, InAs or a combination thereof.

Preferably, ligands surrounding the inorganic part of quantum dots have non-polar components. Preferred ligands include, for example, trioctyl phosphine oxide, dodecanethiol and fatty acid salts (e.g., stearate salts, oleic acid salts).

Preferably, the light stabilizer compound comprising two 1-alkyloxy-2,2,6,6-tetramethyl-4-piperidinyl substituents comprises a linker connecting the substituents, said linker having from 4 to 20 carbon atoms, preferably from 6 to 15, preferably from 8 to 12, preferably 10. Preferably, the linker has no atoms other than carbon, hydrogen and oxygen. Preferably, the linker has from 2 to 6 oxygen atoms, preferably 4. Preferably the linker is a diester substituent group, preferably —OC(O)(CH$_2$)$_n$C(O)O—, wherein n is from 2 to 18, preferably from 4 to 13, preferably from 6 to 10, preferably 8. Preferably the alkyl group in the 1-alkyloxy substituent has from 4 to 12 carbon atoms, preferably from 6 to 10, preferably 8. Preferably, the alkyl group is linear. An especially preferred light stabilizer compound is bis-(1-octyloxy-2,2,6,6-tetramethyl-4-piperidyl)sebacate.

Preferably, the polymer composite comprises from 0.5 to 5 wt % of the light stabilizer compound; preferably at least 1 wt %; preferably no more than 4 wt %, preferably no more than 3 wt %, preferably no more than 2.5 wt %. Preferably, the polymer composite comprises from 0.1 to 15 wt % of metal oxide particles; preferably at least 0.5 wt %; preferably no more than 12 wt %, preferably no more than 10 wt %, preferably no more than 8 wt %.

Other additives which may be incorporated into the polymer composite of this invention include antioxidants, scattering agents to improve light extraction, and thickeners to increase viscosity (e.g., urethane acrylate oligomers). Preferred thickeners include urethane acrylates, cellulose ethers, cellulose acrylic esters, polystyrene polymers, polystyrene block copolymers, acrylic resin and polyolefin elastomers. Preferably, polystyrene, acrylic and polyolefin thickeners have Mw from 50,000 to 400,000; preferably from 100,000 to 200,000. Preferably, cellulose ethers have Mw from 1,000 to 100,000.

Urethane acrylate oligomers can be polyester type, polyether type, polybutadiene type, or polycarprolactone type. They can have difunctional, trifuctional, hexafunctional reactivities. Viscosities of oligomers can range from 1000 to 200,000 cPs at 50 C. For non-polar ligand QDs, polybutadiene types are preferred.

Preferred polystyrene block copolymers have M$_n$ from 50,000 to 400,000 and comprise from 10 to 100 wt % polymerized units of styrene and from 0 to 90 wt % of a non-styrene block. Preferably, the non-styrene monomers in the copolymer (non-styrene block) are alkenes, dienes or a combination thereof. Preferably, the non-styrene block comprises polymerized units of C$_2$-C$_8$ alkenes and/or dienes, preferably C$_2$-C$_5$ alkenes and/or dienes. Preferably, the C$_2$-C$_8$ alkenes and/or dienes are selected from ethylene, propylene, butylene, isoprene and butadiene. Preferably, M$_n$ of the block copolymer is at least 60,000, preferably at least 70,000, preferably at least 80,000; preferably no more than 350,000, preferably no more than 300,000, preferably no more than 250,000.

Preferred forms for the polymer composite include, e.g., films, beads, strips, rods, cubes and plates. The polymer composite is useful in many applications, including, e.g., displays, lighting and medical applications. Preferred display applications include public information displays, signage, televisions, monitors, mobile phones, tablets, laptops, automotive dashboards and watches.

EXAMPLES

Sample Preparation for Examples

All samples were prepared by lamination of the resin formulations between two i-Component PET bather films Approximately 4 g of resin was dispensed on the bottom film and the top was applied with a gap coating bar with gap setup (10 mil) based on desired film thickness. Samples were cured in a Fusion UV F300S curing system with UVA 400mJ/cm2. Photoluminescent Quantum Yield (PLOY), peak emission wavelength (PWL) and full-width half-max of the emission peak (FWHM) were measured on 0.1 inch (2.54 mm) square pieces with a Hamamatsu C9920-02G integrating sphere with 450 nm excitation wavelength.

Example 1

| Formulation (amounts in wt %) | | | | |
|---|---|---|---|---|
|  | 1 | 2 | 3 | 4 |
| Isobornyl acrylate | 53.37 | 51.87 | 51.87 | 51.87 |
| Tricyclodecanediol diacrylate | 19 | 19 | 19 | 19 |
| Irgacure 819 | 1.5 | 1.5 | 1.5 | 1.5 |
| Dymax BR-641D | 25 | 25 | 25 | 25 |
| Tipure 706 | 1 | 1 | 1 | 1 |
| Tinuvin 123 |  | 1.5 |  |  |
| Tinuvin 5060 |  |  | 1.5 |  |
| Tinuvin 5100 |  |  |  | 1.5 |
| Green CFQDs ® | 0.1 | 0.1 | 0.1 | 0.1 |
| Red CFQDs ® | 0.03 | 0.03 | 0.03 | 0.03 |

Dymax BR-641D is a polybutadiene urethane acrylate
Tinuvin 123, 5060, 5100 contain bis-(1-octyloxy-2,2,6,6-tetramethyl-4-piperidinyl) sebacate Results

| Quantum Yield | | | | | |
|---|---|---|---|---|---|
|  | PL QY | Green PWL | Green FWHM | Red PWL | Red FWHM |
| 1 | 19.70 | 522.45 | 46.30 | 647.82 | 63.56 |
| 2 | 38.77 | 521.70 | 44.78 | 632.46 | 63.49 |
| 3 | 22.90 | 521.70 | 45.68 | 633.95 | 66.39 |
| 4 | 39.73 | 521.20 | 45.41 | 635.19 | 64.69 |

The result shows that composites containing bis-(1-octyloxy-2,2,6,6-tetramethyl-4-piperidinyl) sebacate have green and red peak positions at shorter wavelengths. This indicates that quantum dots are better dispersed within the composite.

Example 2

[1] Formulation (amounts in wt %)

|  | Sample A | Sample B | Sample C |
|---|---|---|---|
| Isobornyl acrylate | 51.1 | 51.1 | 43.6 |
| Tricyclodecanediol diacrylate | 30 | 30 | 40 |
| Irgacure 819 | 1.5 | 1.5 | 1.5 |
| 35 nm ZnO particles | 6 | 6 | 2 |
| Kraton G1652 | 9.5 | 9.5 | 11 |
| Tinuvin 123 | 1.5 |  |  |
| Dibutyl Sebacate |  | 1.5 |  |
| bis(2,2,6,6-tetramethyl-4-piperidyl) sebacate |  |  | 1.5 |
| Red CFQDs ® | 0.4 | 0.4 | 0.4 |

KRATON G1652 is a SEBS triblock copolymer containing 28-30% polymerized styrene, used here as a thickener

[2] Results

|  | PL QY | Red PWL | Red FWHM |
|---|---|---|---|
| Sample A | 47.3 | 637.9 | 57.4 |
| Sample B | 47.8 | 650.0 | 60.9 |
| Sample C | 48.8 | 652.0 | 61.0 |

The result shows that composites containing bis-(1-alkylloxy-2,2,6,6-tetramethyl-4-piperidinyl) sebacate have shorter-wavelength red peak position compared to composites containing sebacate molecules with different structures.

Example 3

[1] Formulation containing Tinuvin 123 and TEMPO (amounts in wt %)

|  | Sample 1 | Sample 2 | Sample 3 |
|---|---|---|---|
| Isobornyl acrylate | 31.5 | 31.5 | 31.5 |
| Tricyclodecanediol diacrylate | 40 | 40 | 40 |
| Irgacure 819 | 1.5 | 1.5 | 1.5 |
| 35 nm ZnO particles | 4 | 4 | 4 |
| Kraton G1652 | 11 | 11 | 11 |
| Tinuvin 123 |  | 1.5 |  |
| TEMPO |  |  | 1.5 |
| Red CFQDs ® | 12 | 12 | 12 |

[2] Results

|  | PL QY (%) | Red PWL (nm) | Red FWHM (nm) |
|---|---|---|---|
| Sample 1 | 45.8 | 650.5 | 63.3 |
| Sample 2 | 49.6 | 639.4 | 63.3 |
| Sample 3 | 38.0 | 650.5 | 65.9 |

The result shows that composites containing two bis-(1-alkylloxy-2,2,6,6-tetramethyl-4-piperidinyl) sebacate have shorter wavelength red peak position compared to similar structures with only one unit of (2,2,6,6-Tetramethylpiperidin-1-yl)oxyl without an R group.

The invention claimed is:

1. A polymer composite comprising:
   (a) 0.01 to 5% by weight of quantum dots;
   (b) 50 to 88% by weight of polymerized units of a compound of formula (I)

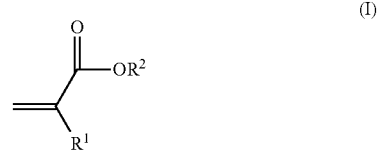

wherein $R^1$ is hydrogen or methyl and $R^2$ is a C6-C20 aliphatic polycyclic substituent; and
   (c) 0.5 to 5% by weight of a light stabilizer compound comprising two 1-alkyloxy-2,2,6,6-tetramethyl-4-piperidinyl substituents; wherein $R^2$ is a bridged polycyclic substituent.

2. The polymer composite of claim 1 in which $R^2$ is a C7-C17 bridged polycyclic substituent.

3. The polymer composite of claim 2 in which the light stabilizer compound comprises a linker connecting the substituents, said linker having from 4 to 20 carbon atoms.

4. The polymer composite of claim 3 in which an alkyl group in each of the 1-alkyloxy-2,2,6,6-tetramethyl-4-piperidinyl substituents has from 4 to 12 carbon atoms.

5. The polymer composite of claim 4 wherein $R^2$ is selected from the group consisting of adamantanes, bicyclo[2,2,1]alkanes, bicyclo[2,2,2]alkanes, bicyclo[2,1,1]alkanes and tricyclodecanes which may be substituted with (meth)acrylate esters such that the polymer composite comprises polymerized units of a compound of formula (I) having one (meth)acrylate ester substituent and a compound of formula (I) having two (meth)acrylate ester substituents in a weight ratio from 100:1 to 1:5, respectively.

6. The polymer composite of claim 5 in which $R^2$ has a bicyclo[2,2,1]alkane or tricyclodecane ring system.

7. The polymer composite of claim 6 in which the quantum dots comprise CdS, CdSe, CdTe, ZnS, ZnSe, ZnTe, HgS, HgSe, HgTe, GaN, GaP, GaAs, InP, InAs or a combination thereof.

8. The polymer composite of claim 5 further comprising a scattering agent.

9. The polymer composite of claim 5 which is a film.

* * * * *